(12) United States Patent
Kobayashi

(10) Patent No.: US 7,130,859 B2
(45) Date of Patent: Oct. 31, 2006

(54) DATA STRUCTURE FOR SEARCH

(75) Inventor: Masayoshi Kobayashi, Tokyo (JP)

(73) Assignee: NEC Corporation (JP)

( * ) Notice: Subject to any disclaimer, the term of this patent is extended or adjusted under 35 U.S.C. 154(b) by 670 days.

(21) Appl. No.: 09/770,017

(22) Filed: Jan. 25, 2001

(65) Prior Publication Data
US 2001/0010048 A1    Jul. 26, 2001

(30) Foreign Application Priority Data
Jan. 26, 2000    (JP)    ............... 2000/021782

(51) Int. Cl.
*G06F 17/30*    (2006.01)
(52) U.S. Cl. ............... 707/102; 707/2; 707/3; 707/100; 707/101
(58) Field of Classification Search ............... 707/1, 707/2, 3, 101, 102, 104.1, 100
See application file for complete search history.

(56) References Cited

U.S. PATENT DOCUMENTS 5,404,513 A * 4/1995 Powers et al. ............... 707/102
6,467,003 B1 * 10/2002 Doerenberg et al. ........ 710/117
6,633,879 B1 * 10/2003 Jeffries ........................ 707/100

FOREIGN PATENT DOCUMENTS

JP    2576549    11/1996

OTHER PUBLICATIONS

Japanese Office Action dated Jan. 13, 2004 (and English translation of relevent portion).

* cited by examiner

*Primary Examiner*—Tim Vo
*Assistant Examiner*—Hung Pham
(74) *Attorney, Agent, or Firm*—Dickstein, Shapiro, LLP.

(57) ABSTRACT

A data structure allowing the necessary amount of memory to be reduced while maintaining or improving search performance is disclosed. The data structure in which items of data are stored for search includes: a tree structure in which the items or data are stored except for a portion of the items of data corresponding to a sub-tree structure, which is a selected portion of an assumed tree structure formed by all the items of data; and an equivalent table storing the portion of the items of data in table form.

13 Claims, 12 Drawing Sheets

FIG. 1 (PRIOR ART)

| DATA TO BE SEARCHED | RELATED INFORMATION |
|---|---|
| 0 0 | A |
| 0 0 0 0 | B |
| 0 0 0 1 | C |
| 0 0 0 1 1 | D |
| 1 1 0 1 0 | E |
| 1 1 1 1 1 | F |

FIG. 3 (PRIOR ART)

| EXPANDED DATA TO BE SEARCHED | RELATED INFORMATION |
|---|---|
| 0 0 | A |
| 0 0 0 0 | B |
| 0 0 0 1 | C |
| 0 0 0 1 1 0 | D |
| 0 0 0 1 1 1 | D |
| 1 1 0 1 0 0 | E |
| 1 1 0 1 0 1 | E |
| 1 1 1 1 1 0 | F |
| 1 1 1 1 1 1 | F |

FIG. 9

| DATA TO BE SEARCHED | RELATED INFORMATION |
|---|---|
| 0 0 | A |
| 0 0 0 0 | B |
| 0 0 0 1 | C |
| 0 0 1 0 | D |
| 1 0 0 0 | E |
| 1 0 0 0 0 | F |
| 1 1 0 1 | G |
| 1 1 0 1 0 | H |

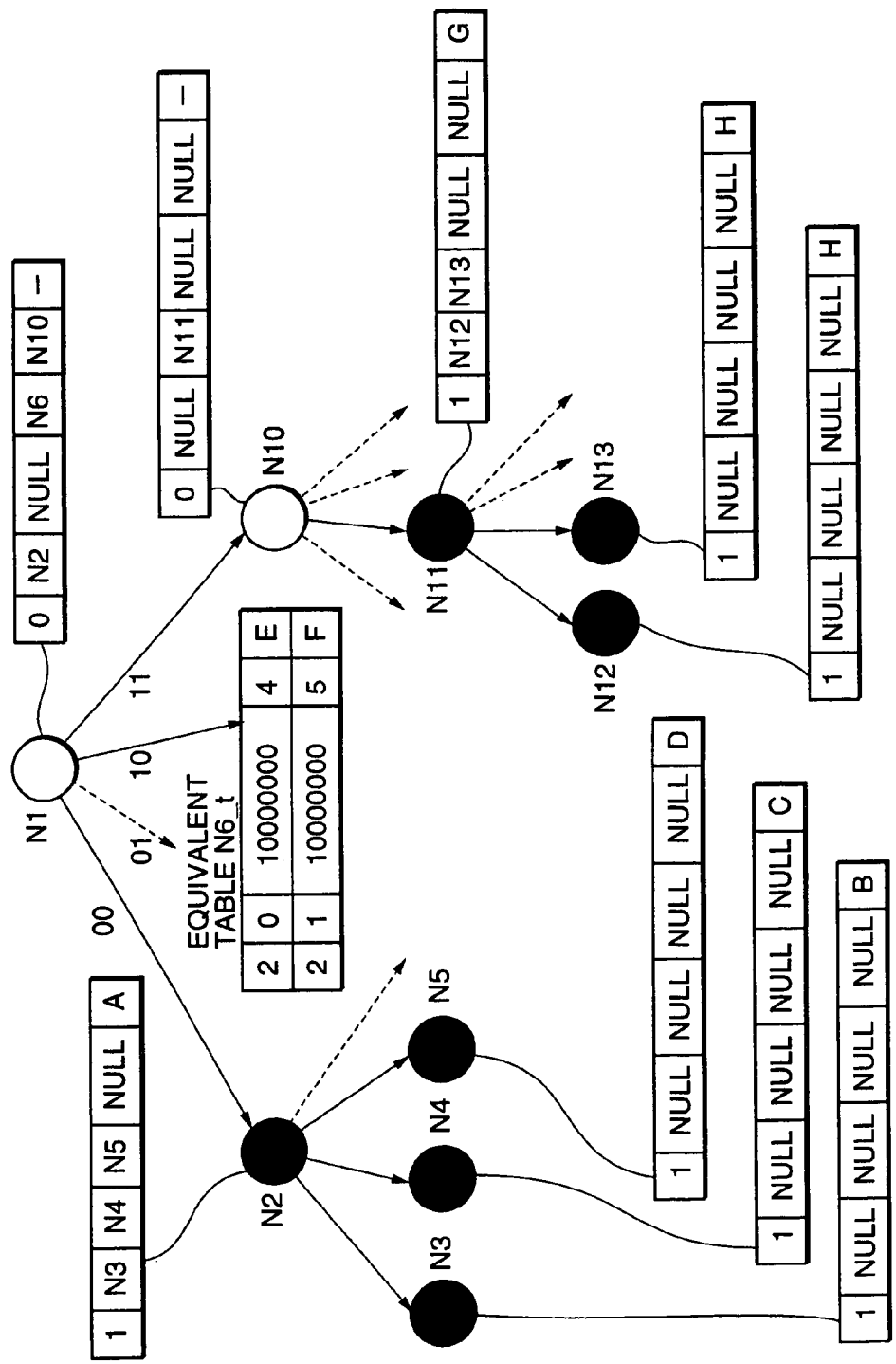

DATA STRUCTURE FOR SEARCH

BACKGROUND OF THE INVENTION

1. Field of the Invention

The present invention relates to a data search system, and in particular to a data structure for search and a method of constructing the same.

2. Description of the Related Art

As a data search method, there have been known a table search that uses a table for search and a radix search that uses a tree structure for search. The table search such as a linear search or a binary search has a disadvantage that it takes increasingly much time for search with increase in the amount of data to be searched.

The radix search treats data as strings of symbols selected from a limited number of kinds of symbols and uses a tree structure in which a set of the strings of symbols is classified according to a sequential one of symbols starting at the top of each string of symbols and each node is linked to several others by branches. Each node linked to zero or more children stores pointers to zero or more children as many as the number of kinds included in the string of symbols. Provided with search data consisting of a plurality of symbols, the radix search is carried out by following nodes of the tree from a parent to its selected child according to a sequential one symbol of the given search data until a target is found.

Taking a longest prefix search method as an example, the radix search method will be described in detail. In the longest prefix search method, each item of data to be searched is represented by a fixed-length (L) or loss string of bits and has its related information. When provided with search data, all items of data matching the search data are found and one item having the longest match among them is selected as a target.

In the case where each item of data to be searched and its related information as shown in FIG. 1, a binary tree in which the data is stored is shown in FIG. 2. For example, when search data "0001111" is provided, the search is carried out by following nodes in the order presented: N1, N2, N3, N4, N6, and N7 while reading the related information from a node having a node information flag set (indicated by blacked circle). In this case, at the nodes N3, N6, and N7, the node information flag is set. In other words, the item of data stored in each of these nodes N3, N6, and N7 matches the search data. Among them, the related information "D" stored in the node N7 having the longest match (the lowest level) is obtained as a target. Assuming that the time required to follow one node is T, the maximum search time is 6T in the case of FIG. 2.

In order to reduce the depth of a tree to shorten the maximum search time, N-ary tree structure (N>2) is usually employed. In the case of N=4 (quad tree structure), the search data is sequentially read in units of two bits. Accordingly, an item of data consisting of an odd number of bits is expanded to data having a bit length of an integral multiple of 2 so as to meet the quad tree structure. For example, 5 bit data "00011" having the related information "D" is expanded to two items of 6-bit data: "000110" and "000111", each having the same related information "D", as shown in FIG. 3.

In the case where each item of expanded data to be searched and its related information as shown in FIG. 3, a quad tree in which the data is stored is shown in FIG. 4. Each node stores data having a format composed of a node information flag field FG, a pointer field having four pointers each corresponding branches: "00", "01", "10", and "11" to its child nodes, and a related information field. The node information flag FG is set to 1 when storing data and to 0 when storing no data. In the node N2, for example, the node information flag FG is set to 1. The respective four pointers each corresponding to "00", "01", "10", and "11" indicate N3, N4, N5 and NULL, which means that the node N2 has three corresponding branches to the child nodes N3, N4, and N5 and has no branch for "11". The node N2 stores the related information A.

For example, when search data "0001111" is provided, the search is carried out by following nodes in the order presented: N1, N2, N4, and N7 while reading the related information from nodes N2, N4, and N7 each having the node information flag FG set to 1 (indicated by blacked circle). In this case, the item of data stored in each of these nodes N2, N4, and N7 matches the search data "0001111". Among them, the related information "D" stored in the node N7 having the longest match (the lowest level) is obtained as a target. Assuming that the time required to follow one node is T, the maximum search time is 4T in the case of FIG. 4. Compared with the binary tree as shown in FIG. 2, the quad tree reduces its maximum search time to two-thirds the maximum search time of the binary tree.

However, if N for N-ary tree is set to a large number so as to shorten the maximum search time, then the number of nodes having the same related information is increased by expanding the data to meet the N-ary tree. In addition, since the size of one node and the number of pointers included therein are also increased in proportion to N, an increasing amount of memory is needed.

For example, in the case of each node storing 1-bit node information flag FG, four 6-bit pointers, and 8-bit related information, each node needs 21 bits (=1+6×2+8) for the binary tree and 33 bits (=1+6×4+8) for the quad tree. The total of bits needed in the binary tree as shown in FIG. 2 is 21(bits)×15(nodes)=315 bits and the total of bits needed in the quad tree as shown in FIG. 4 is 33(bits)×14(nodes)=462 bits. Assuming that the length of bits per address in a memory storing the data to be searched is 32 bits, 15 addresses are needed for the binary tree but 28 addresses for the quad tree.

As described above, according to a conventional N-ary tree data structure, the number of nodes having the same related information is increased by expanding the data to meet the N-ary tree. In addition, since the size of one node and the number of pointers included therein are also increased in proportion to N, an increasing amount of memory is needed.

SUMMARY OF THE INVENTION

An object of the present invention is to provide a data search system and a data structure allowing the necessary amount of memory to be reduced while maintaining or improving search performance, compared with the radix search method.

According to the present invention, a data structure in which items of data are stored for search, includes: a tree structure in which the items of data are stored except for a portion of the items of data corresponding to a sub-tree structure, which is a selected portion of an assumed tree structure formed by all the items of data; and an equivalent table storing the portion of the items of data in table form.

The tree structure may include a plurality of nodes, each of which is composed of a node information flag, a plurality of pointers each corresponding to predetermined branches, and related information, wherein each of the pointers indicates one of its child node, the equivalent table, and NULL. The equivalent table may include a plurality of entries, each of which is composed of a table node information flag, a tail entry flag, a data bit string, a search bit length, and related information.

The data bit string may be arranged so that a length of the data bit string is equal to that of search data, wherein the search bit length indicates a length of an original data bit string to match with the search data. The entries in the equivalent table may be stored at consecutive locations in a memory.

The sub-tree structure may be selected so as to satisfying the following conditions: a) an amount of memory required to store the data structure is smaller than that required to store the assumed tree structure; and b) search performance of the data structure is not lower than that of the assumed tree structure.

According to another aspect of the present invention, a method for constructing a data structure in which items of data are stored for search, includes the steps of: a) forming an assumed tree structure in which all the items of data are stored; b) sequentially selecting a node from the assumed tree structure to select a sub-tree structure designated by the selected node; c) forming an equivalent table storing a portion of the items of data corresponding to the selected sub-tree structure in a table form; d) determining whether the selected sub-tree structure satisfies the following conditions: 1) an amount of memory required to store a data structure including the equivalent table in place of the selected sub tree structure is smaller than that required to store the assumed tree structure; and 2) search performance of the data structure is not lower than that of the assumed tree structure; and e) when the selected sub-tree structure satisfies the conditions (1) and (2), replacing the selected sub-tree structure with the equivalent table to construct the data structure.

The condition (1) may be that, when the selected sub tree structure is replaced with the equivalent table to form a new data structure, a maximum search time Tmax_t calculated from the new data structure does not exceed a maximum search time Tmax calculated from the assumed tree structure. The condition (2) may be that, when the selected sub-tree structure is replaced with the equivalent table to form a new data structure, a necessary amount of memory for the new data structure is smaller than that for the assumed tree structure.

A decision on whether the conditions (1) and (2) may be satisfied is made depending on whether the following equation is satisfied:

$$N_D \leq N_L \times K, \text{ when } K=Te/Tn,$$

where $N_D$ is the number of items of data included in the selected sub-tree structure, $N_L$ is the number of levels of the selected node or lower in the assumed tree structure, Tn is search time per node, and Te is search time per entry in the equivalent table.

According to further another aspect of the present invention, an apparatus for constructing a data structure in which items of data are stored for search, includes: a tree formation section for forming an assumed tree structure in which all the items of data are stored; a node selector for sequentially selecting a node from the assumed tree structure to select a sub-tree structure designated by the selected node, forming an equivalent table storing a portion of the items of data corresponding to the selected sub-tree structure in a table form, and determining the selected sub-tree structure when it satisfies the following conditions; 1) an amount or memory required to store a data structure including the equivalent table in place of the selected sub-tree structure is smaller than that required to store the assumed tree structure; and 2) search performance of the data structure is not lower than that of the assumed tree structure; and a data structure formation section for replacing the selected sub-tree structure satisfying the conditions (1) and (2) with the equivalent table corresponding to the selected sub-tree structure to construct the data structure.

According to still another aspect of the present invention, a search system includes: a memory storing a data structure in which items of data are stored for search, the data structure comprising: a tree structure in which the items of data are stored except for a portion of the items of data corresponding to a sub-tree structure, which is a selected portion of an assumed tree structure formed by all the items of data; and an equivalent table storing the portion of the items of data in table form: and a search section for searching the data structure for an item of data matching input search data.

The search system may further include: a tree formation section for forming an assumed tree structure in which all the items of data are stored; a node selector for sequentially selecting a node from the assumed tree structure to select a sub-tree structure designated by the selected node, forming an equivalent table storing a portion of the items of data corresponding to the selected sub-tree structure in a table form, and determining the selected sub-tree structure when it satisfies the following conditions: 1) an amount of memory required to store a data structure including the equivalent table in place of the selected sub-tree structure is smaller than that required to store the assumed tree structure; and 2) search performance of the data structure is not lower than that of the assumed tree structure; and a data structure formation section for replacing the selected sub-tree structure satisfying the conditions (1) and (2) with the equivalent table corresponding to the selected sub-tree structure to construct the data structure that is stored in the memory.

According to another aspect of the present invention, a storage medium for used in a search system, storing computer-readable items of data to be searched in a data structure, the data structure comprising: a tree structure in which the items of data are stored except for a portion of the items of data corresponding to a sub-tree structure, which is a selected portion of an assumed tree structure formed by all the items of data; and an equivalent table storing the portion of the items of data in table form.

According to another aspect of the present invention, a storage medium storing a computer-readable program for constructing a data structure in which items of data are stored for search, the program includes the steps of: a) forming an assumed tree structure in which all the items of data are stored: b) sequentially selecting a node from the assumed tree structure to select a sub-tree structure designated by the selected node; c) forming an equivalent table storing a portion of the items of data corresponding to the selected sub-tree structure in a table form; d) determining whether the selected sub-tree structure satisfies the following conditions: 1) an amount of memory required to store a data structure including the equivalent table in place of the selected sub-tree structure is smaller than that required to store the assumed tree structure; and 2) search performance of the data structure is not lower than that of the assumed tree structure; and e) when the selected sub-tree structure satisfies the conditions (1) and (2), replacing the selected sub-tree structure with the equivalent table to construct the data structure.

As described above, the equivalent table stores a plurality of entries without the need of pointers to child nodes as in the case of a tree structure, resulting in reduced amount of memory required to store the data structure.

Further, a node to be replaced with an equivalent table is selected on condition that, if the node is replaced with the equivalent table, then the maximum search time for a new data structure including the equivalent table is not longer than the calculated maximum search time and the necessary amount of memory is reduced. In other words, when the number of items of data existing at the node or lower in the assumed tree structure is sufficiently small, the node is replaced with the equivalent table. Accordingly, the present invention provides a search system allowing the necessary amount of memory to be reduced without decreasing in performance compared with the conventional radix search method.

BRIEF DESCRIPTION OF THE DRAWINGS

FIG. 1 is a diagram showing an example of a set of data to be searched and corresponding related information;

FIG. 3 is a diagram showing a set of expanded data to be searched and corresponding related information, wherein the expanded data are obtained by expanding the data as shown in FIG. 1 to meet a quad tree;

FIG. 9 is a diagram showing an example of a set of data to be searched and corresponding related information;

FIG. 12 is a diagram showing another example of a data structure for search constructed by the second embodiment or the present invention.

DESCRIPTION OF THE PREFERRED EMBODIMENTS

Figure 5:
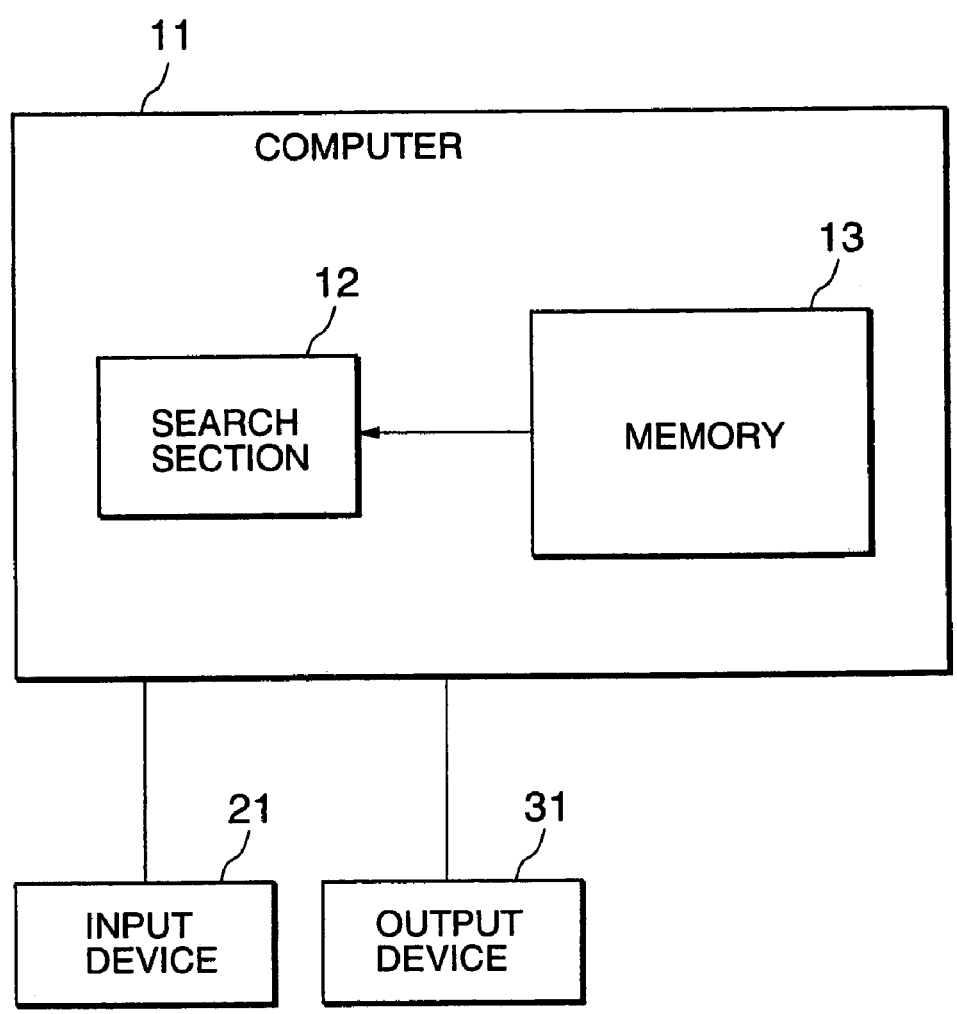
FIG. 5 is a schematic block diagram showing a data search system that implements a data structure according to the present invention.

Referring to FIG. 5 a search system is composed of a computer 11, an input device 21 such as a keyboard and a pointing device, and an output device 31 such as a monitor.

The computer 11 implements a search section 12 by running a program thereon. A memory 13 is a main memory for a processor to store a data structure according to the present invention.

Figure 2:
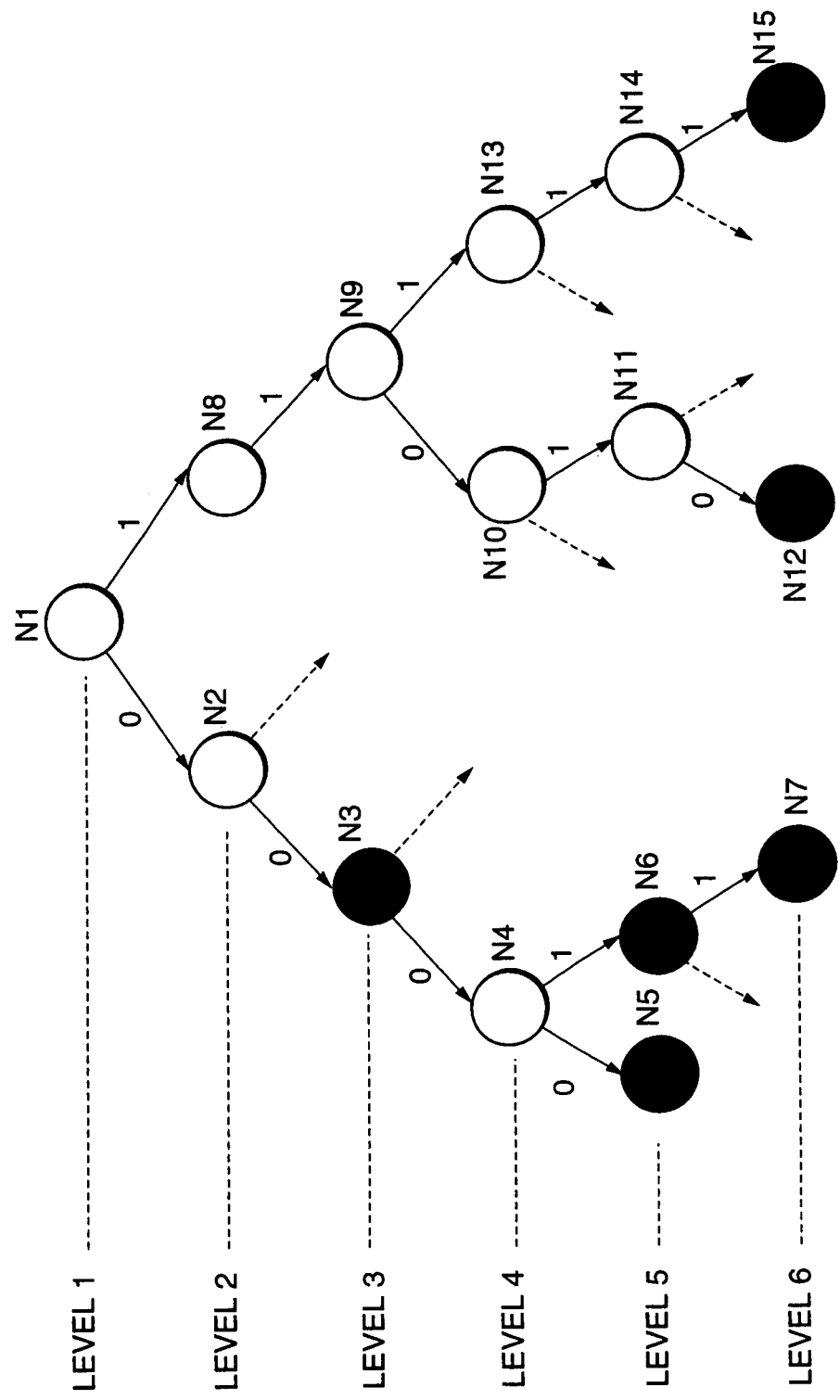
FIG. 2 is a diagram showing a conventional binary tree structure in which the data to be searched are stored.
Figure 4:
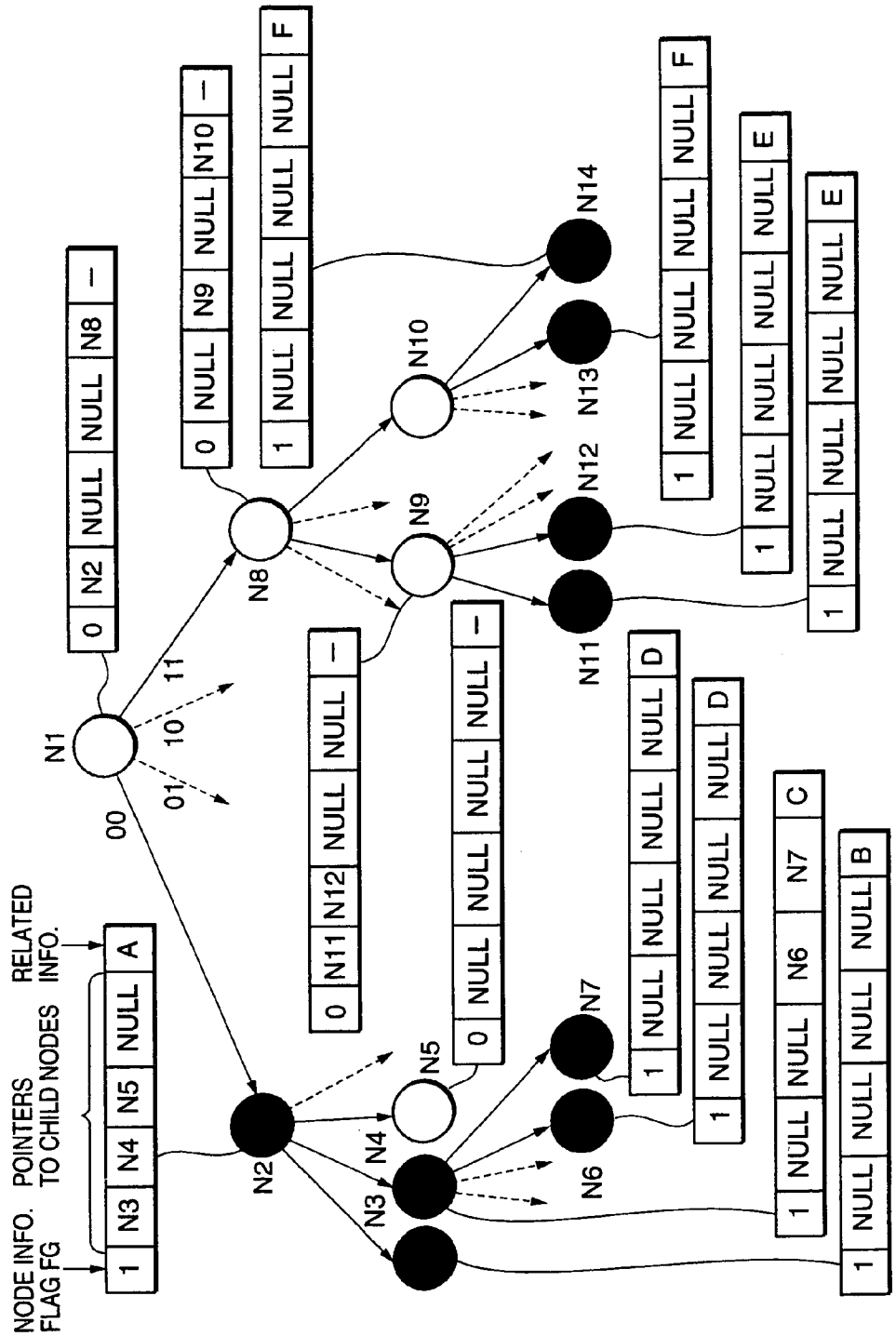
FIG. 4 is a diagram showing a conventional quad tree structure in which the expanded data to be searched are stored.
Figure 6:
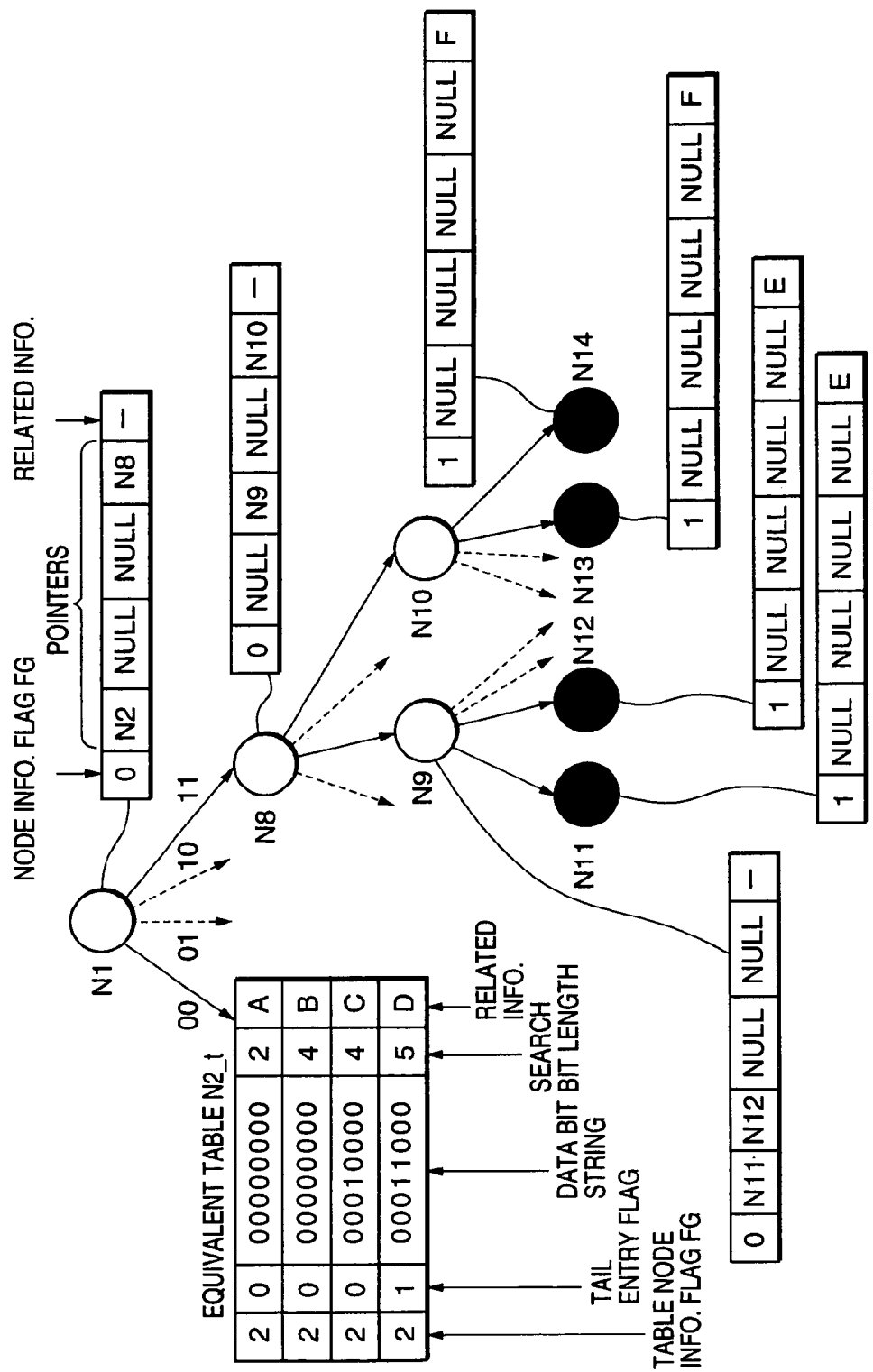
FIG. 6 is a diagram showing an example of a data structure for search according to an first embodiment of the present invention.

Referring to FIG. 6, a data structure according to a first embodiment of the present invention is formed by an equivalent table and a quad tree used in the radix search, assuming the maximum bit length L=8 bits. In this example, the data structure as shown In FIG. 6 is obtained by replacing the node N2 and its child nodes N3–N7 as shown in FIG. 4 with the equivalent table N2_t. In other words, a set of data represented by the node N2, that is, all the data included in a set of bit strings each starting with "00", are stored in the equivalent table N2_t.

As shown in FIG. 6, each of the nodes N1, N8, N9–N14 stores information having a format composed of a node information flag field FG, a pointer field having four pointers each corresponding branches: "00", "01", "10", and "11" to its child nodes, and a related information field. The node information flag FG is set to 1 when storing data to be searched and to 0 when storing no data to be searched.

In the node N1, for example, the node information flag FG is set to 0 because the node N1 does not store the related information corresponding to data to be searched. The respective four pointers each corresponding to "00", "01", "10", and "11" indicate the equivalent table N2_t, NULL, NULL, and the node N8. Since the node information flag FG is set to 0, the node N1 stores an invalid value "–" in the related information field thereof.

In the node N8, for example, the node information flag FG is set to 0 because the node N8 does not store data to be searched. The respective four pointers each corresponding to branches "00", "01", "10", and "11" indicate NULL, the node N9, NULL, and the node N10. Since the node information flag FG is set to 0, the node N8 stores an invalid value "–" in the related information field thereof.

In the node N11, for example, the node information flag FG is set to 1 because the node N11 stores data to be searched (here, "110100"). All four pointers each corresponding to "00", "01", "10", and "11" indicate NULL because the node N11 is a leaf node. Since the node N11 stores the data "110100", the related information "E" is stored (see FIG. 3).

The equivalent table N2_t stores as entries the items of data to be searched corresponding to the node N2 and its child nodes N3–N7 as shown in FIG. 4. Here, the respective entries are located as entries at consecutive addresses in the memory 13. Each of the entries stored in the equivalent table N2_t has a format composed of a 2-bit table node information flag field FG, a tail entry flag field, a data bit string field, a search bit length field, and a related information field.

A 2-bit table node information flag FG is set to "2" for all the entries of the table N2_t. A tail entry flag is set to "1" for the last entry and to "0" for the other entries. A string of data bits for each entry is formed by adding one or more bits "0" to the corresponding item of data to be searched so that the bit length of the corresponding item of data is equal to the maximum bit length L (L=8) of search data. The search bit length indicates the number of bits to be searched from the topmost bit. The related information field stores related information corresponding to the item of data to be searched.

SEARCH OPERATION

In the above-described data structure, when branching to a node having a node information flag of "0" or "1", the search is carried out by following the tree of nodes while sequentially checking the search data in units of two bits as the case of FIG. 4. When branching to one having the node information flag of "2", the control is shifted to the equivalent table N2_t and the search operation is carried out by simply searching the equivalent table N2_t for an entry matching the search data. The details of search operation will be described hereafter.

Figure 7:
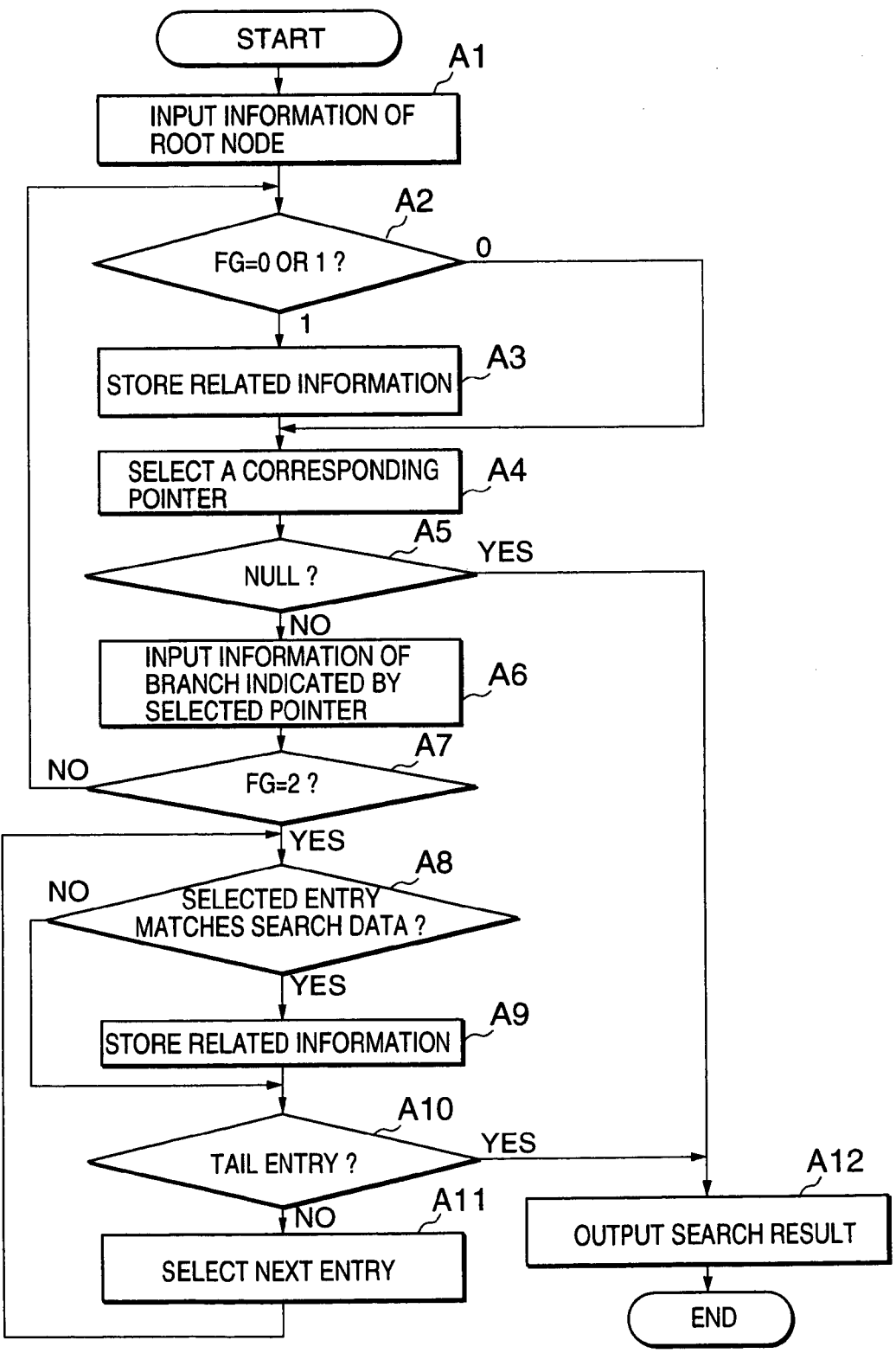
FIG. 7 is a flow chart showing a search operation using the data structure according to the first embodiment.

Referring to FIG. 7, when inputting search data through the input device 21, the search section 12 reads the information of a root node from the memory 13 storing the data structure as shown in FIG. 6 (step A1). Then, the search section 12 determines whether the node information flag FG of a node in question is "0" or "1" (step A2). When the node information flag FG is "1", the search section 12 stores the related information stored in the node and a length of matching bits into a memory (not shown) (step A3). Here, a length of matching bits is dependent on the level of a node in question. For example, in a node at a level NL, a length of matching bits is 2×(NL−1).

After the step A3 or when the node information flag FG is "0", a pointer corresponding to the first 2 bits of the search data is selected from the four pointers (step A4) and it is determined whether the value of the selected pointer is NULL (step A5). If the value of the selected pointer is NULL (YES at step A5), then the search section 12 selects the longest matching one from the related information stored and outputs it as a search result to the output device 31 (step A12) and then the search operation is ended.

If the value of the selected pointer is not NULL (NO at step A5), then the search section 12 inputs the information of a branch indicated by the selected pointer (step A6). At this stage, it cannot be known if the branch indicated by the selected pointer is a node or the first entry of the equivalent table. Therefore, the search section 12 accesses a selected number of addresses of the memory 13 starting with the address indicated by the selected pointer using one which of the number of addresses required to store data for a node and the number of addresses required to store data for an entry of the equivalent table is greater than the other. In the case where the number of addresses required to store data for a node is "2" and the number of addresses required to store data for an entry of the equivalent table is "1", the search section 12 accesses the two addresses of x and x+1, where the address x is indicated by the selected pointer.

After the information of a branch indicated by the selected pointer is inputted (step A6), it is determined whether a node information flag FG is "2" (step A7). When the node information flag FG is not "2" (NO at step A7), the control goes back to the step A2 and the search is carried out by following the tree as indicated by the steps A2–A6.

When the node information flag FG is "2" (YES at step A7), it means that the branch is the equivalent table N2_t. Accordingly, the search section 12 determines whether the data bit string of a selected entry in the equivalent table N2_t matches the search data with respect to the search bit length thereof (step A8).

When the data bit string of a selected entry in the equivalent table N2_t matches the search data with respect to the search bit length thereof (YES at step A8), the search section 12 stores the related information stored in the entry in question and a length of matching bits (equal to the corresponding search bit length) into the memory (not shown) (step A9).

After the step A9 or when the data bit string of a selected entry in the equivalent table N2_t does not match the search data with respect to the search bit length thereof (NO at step A8), it is determined whether the entry in question is the tail entry (step A10). When the entry in question is not the tail entry (NO at step A10), the subsequent entry is selected (step A11) and then the steps A8–A10 are repeatedly performed until the tail entry. When the entry in question is the tail entry (YES at step A10), the search section 12 selects the longest matching one from the related information stored and outputs it as a search result to the output device 31 (step A12) and then the search operation is ended.

The search operation will be described taking the data structure as shown in FIG. 6 as an example.

Assuming that search data "00011111" is input through the input device 21, the search section 12 reads the information of the root node N1 from the memory 13 storing the data structure as shown in FIG. 6 and then determines whether the node information flag FG of the node N1 is "0" or "1" (steps A1 and A2). Since the node information flag FG is "0" and the first 2 bits of the search data is "00", the pointer for "00" corresponding to the first 2 bits of the search data is selected (step A4). Since the pointer for "00" indicates the equivalent table N2_t, the search section 12 inputs the information of the first entry stored in the equivalent table N2 t (step A6).

Since the node information flag FG of the first entry is "2" (YES at step A7), the search section 12 determines whether the data bit string of the first entry in the equivalent table N2_t matches the search data with respect to the search bit length thereof (step A8).

In this example, the data bit string of the first entry is "00000000" and the search bit length thereof is "2". Since the first 2 bits of the search data "00011111" matches that of the data bit string "00000000" (YES at step A8), the search section 12 stores the related information "A" stored in the first entry and a length of matching bits "2" into the memory (not shown) (step A9). Thereafter, the second entry of the equivalent table N2_t is selected (step A11) and then the steps A8–A10 are repeatedly performed while sequentially selecting the entries of the equivalent table N2_t until the entry in question reaches the tail entry. Here, in the cases of the third and fourth entries, the step AS determines that the first 2 bits of the search data "00011111" matches that of the data bit string. Therefore, a pair of the related information "C" stored in the third entry and a length of matching bits "4" and a pair of the related information "D" stored in the fourth entry and a length of matching bits "5" are stored in the memory (not shown) (step A9).

When the entry in question reaches the tail entry (YES at step A10), the search section 12 selects the related information "D" having the longest matching length and outputs it as a search result to the output device 31 (step A12).

In this embodiment, a pair or the related information and the search bit length is stored in the memory (not shown) at the steps A3 and A9.

Alternatively, the equivalent table N2_t may be previously sorted in ascending order of search bit length. In this case, only the related information is stored in the memory (not shown) at the steps A3 and A9 and the related information stored latest is output as a search result to the output device 31.

The major portion of search time is occupied by memory access time. Accordingly, it can be assumed that the time required to access one entry of the equivalent table N2_t is substantially equal to the time T required to follow one node of the tree. In the case where a search result is obtained from the equivalent table N2_t, the maximum search time is 5T that is obtained by adding the time T required to follow the node N1 and the time 4T required to search all entries of the equivalent table N2_t. In the case where the equivalent table N2 t is not accessed but one of the nodes N11–N14, the maximum search time is 4T as described before. Therefore, the maximum search time of the embodiment is 5T.

As described above, the equivalent table stores a plurality of entries without the need of pointers to child nodes as in the case of a tree structure, resulting in reduced amount of memory to store the data structure. For example, the size of the data structure of the present embodiment as shown in FIG. 6 is smaller than that of the conventional data structure as shown in FIG. 4. Each node in the data structure according to the embodiment needs a total of 34 bits, which is greater than that of the conventional data structure as shown in FIG. 4 by 1 bit because a node information flag FG for each node in the embodiment is 2 bits while that of the conventional data structure is 1 bit. In the case where each entry in the equivalent table is composed of 2-bit node information flag FG, 1-bit tail entry flag, 8-bit data bit string (L=8), 4-bit search data length, and 8-bit related information, a total of bits for each entry in the equivalent table is 23. Accordingly, when 8 nodes and 4 entries are stored as shown in FIG. 6, a total of bits in the data structure are 365 (=34×8+23×4).

In contrast, since each of 14 nodes needs 33 bits in the conventional data structure as shown in FIG. 4, a total of bits is 462 (=33×14). Therefore, compared with the conventional data structure, the present embodiment allows the size of data structure to reduce by about 22%.

Further, the present embodiment can reduce the number of addresses to store the data structure. Assuming that the number of bits for each address is 32, the conventional data structure as shown in FIG. 4 needs 28 addresses because two addresses are needed to store data for each of 14 nodes.

Contrarily, according to the present embodiment, the number of nodes is 8, the number of entries in the equivalent table is 4, the necessary number of addresses to store data for one nods is 2, and the necessary number of addresses to store data for one entry is 1. Accordingly, the necessary number or addresses to store the data structure as shown in FIG. 6 is 20 (=2×8+1×4). Therefore, compared with the conventional data structure, the present embodiment allows the number of addresses in the memory to reduce by about 29%.

DATA STRUCTURE CONSTRUCTION

Figure 8:
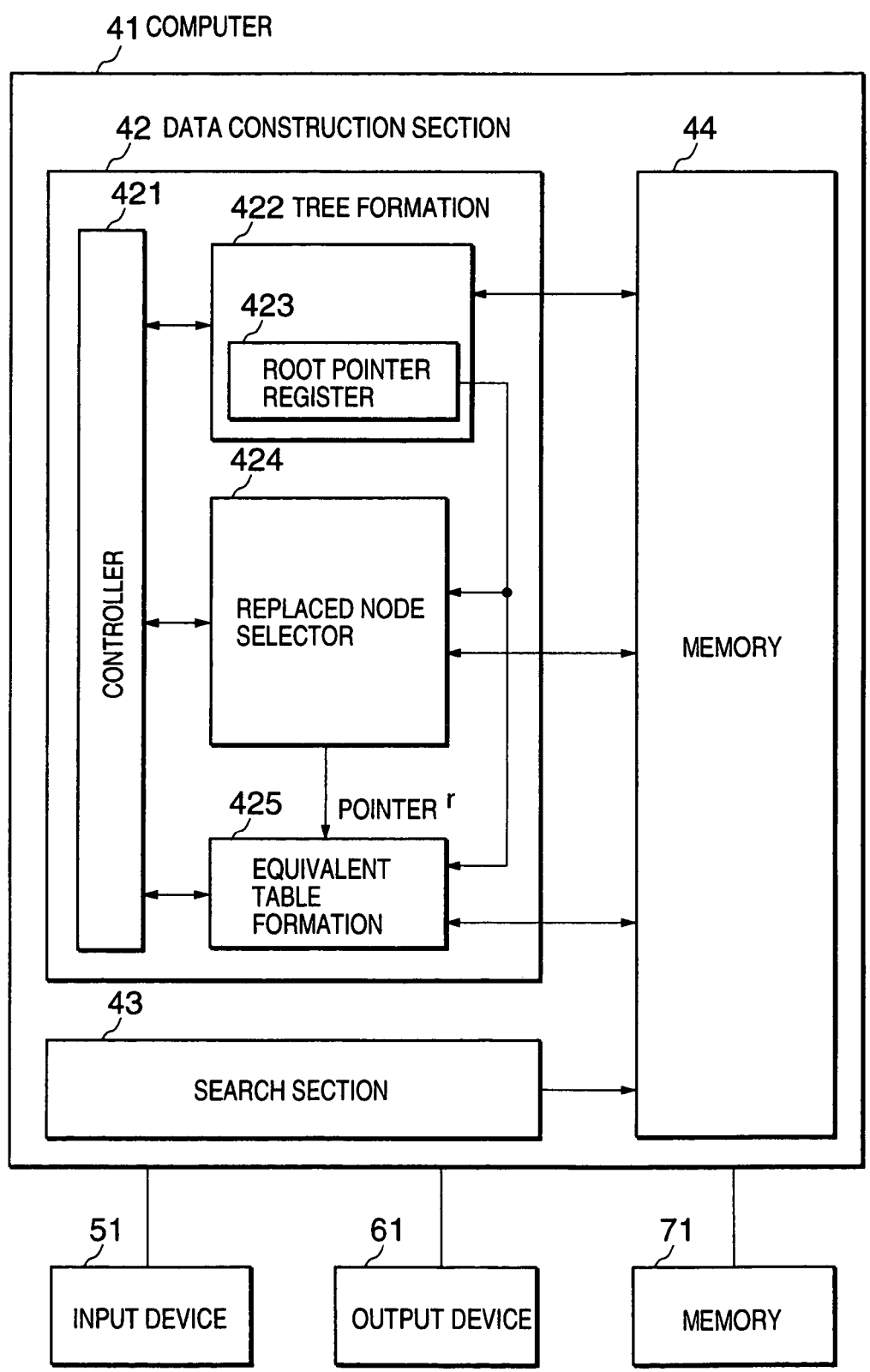
FIG. 8 is a schematic block diagram showing a data search system having a data construction section according to the present invention.

Referring to FIG. 8, a search system is composed of a computer 41, an input device 51 such as a keyboard and a pointing device, an output device 61 such as a monitor, and a memory 71, which are connected to the computer 41. The computer 41 implements a data construction section 42 and a search section 43 by running corresponding programs stored in the memory 71 such as a nonvolatile semiconductor memory, a disk, or the like. A memory 44 is a main memory for a processor to store data to be searched and corresponding related information, which are used to construct a data structure according to the present invention.

The search section 43 has the same functions as the search section 12 as shown in FIG. 5. The data construction section 42 includes a controller 421, a tree formation section 422 including a route pointer register 423, a replaced node selector 424, and an equivalent table formation section 425. The controller 421 controls the operation of the components in the data construction section 42.

The tree formation section 422 has a function of forming a tree structure (here, quad tree) used for radix search on the memory 44 based on the data to be searched and corresponding related information, which are stored in the memory 44.

The replaced node selector 424 has a function or calculating the maximum search time in the tree structure formed by the tree formation section 422 and further a function of selecting a node to be replaced with an equivalent table on condition that, if the node is replaced with the equivalent table, then the maximum search time for a new data structure including the equivalent table is not longer than the calculated maximum search time and the necessary amount of memory is reduced.

The equivalent table formation section 425 has a function of forming an equivalent table from the tree structure of the selected node or lower so that the equivalent table stores all items of data to be searched included in a set of data indicated by the selected node to be replaced with the equivalent table and a function of replacing the tree structure of the selected node or lower with the equivalent table.

Hereafter, the data structure construction operation will be described by referring to FIGS. 9–12.

Figure 10:
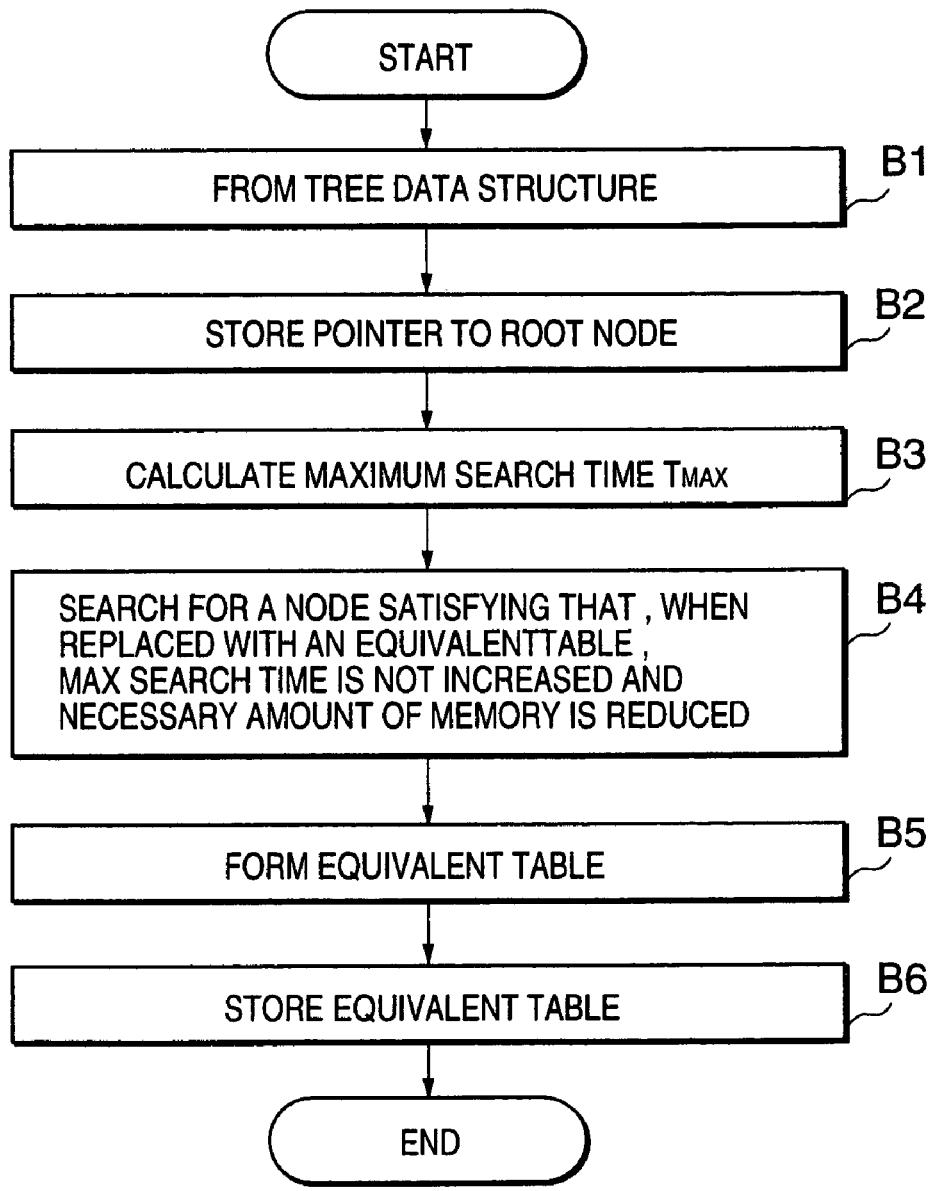
FIG. 10 is a flow chart showing a data-structure construction operation according to an second embodiment of the present invention.
Figure 11:
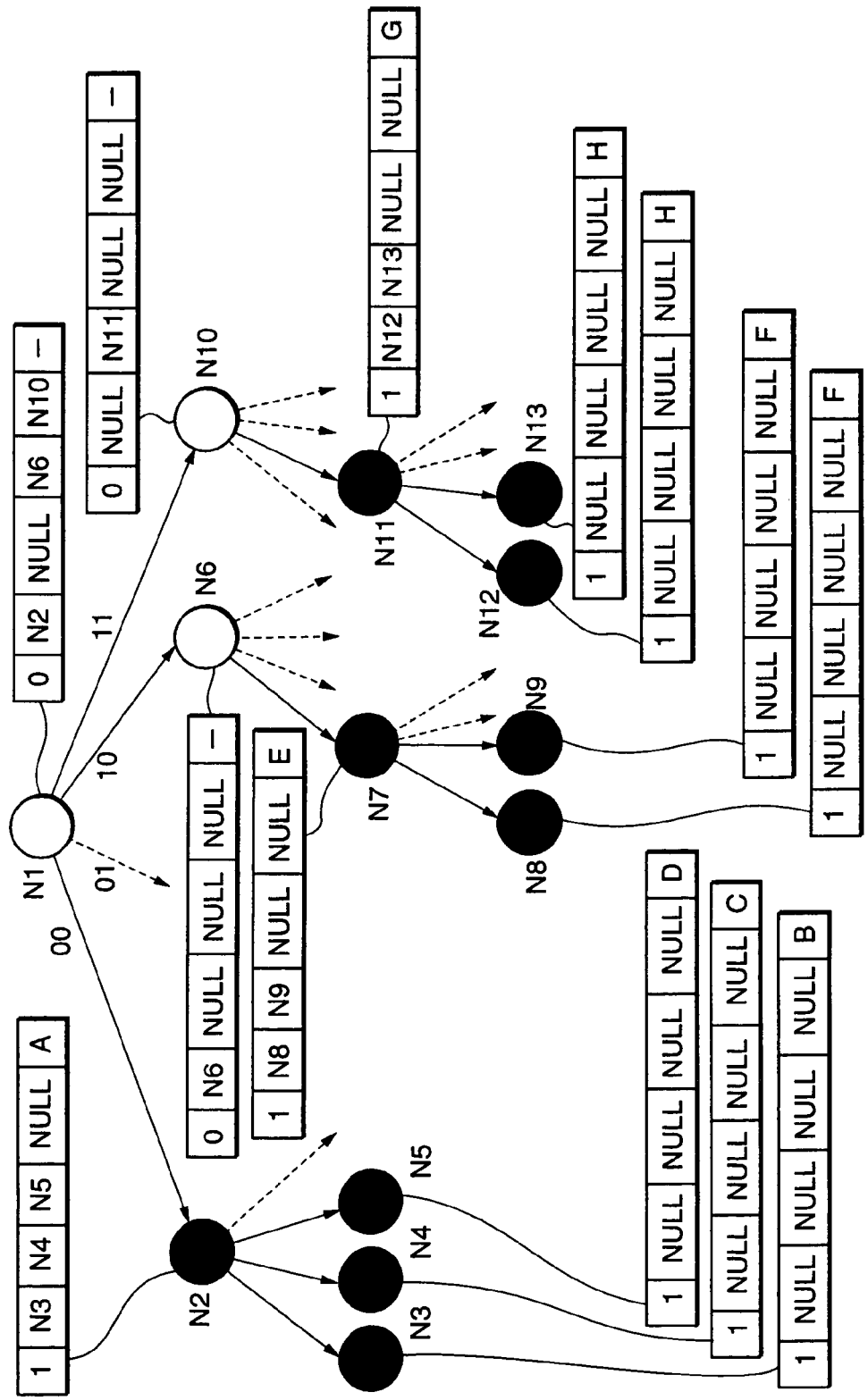
FIG. 11 is a diagram showing an example of a tree structure formed in a tree formation section according to the second embodiment of the present invention.

Referring to FIG. 10, when the controller 421 instructs the tree formation section 422 to form a tree data structure for radix search, the tree formation section 422 forms a tree data structure as shown in FIG. 11 on the memory 44 based on the data to be searched and corresponding related information as shown in FIG. 9 (step B1).

In FIG. 11, the information stored in each of the nodes N1–N13 is similar to that in each of the nodes N1–N14 as shown in FIG. 4.

Thereafter, the tree formation section 422 stores a pointer to the root node N1 in the root pointer register 423 (step B2). When the tree formation operation of the tree formation section 422 has been completed, the controller 421 starts the replaced node selector 424.

The replaced node selector 424 calculates a maximum search time Tmax for a tree structure of the root node N1 indicated by the pointer stored in the root pointer register 423 (step B3). The maximum search time Tmax is calculated by Tn×NLmax, where Tn is the time required to follow one node of the tree and NLmax is a level of a lowermost node in the tree.

Further, the replaced node selector 424 sequentially selects the nodes of the tree structure as shown in FIG. 11 according to a predetermined rule. For example, the nodes of FIG. 11 are sequentially selected in ascending order of level and, when two or more nodes are found at the same level, these nodes are sequentially selected in branch order presented: "00", "01", "10", and "11".

The replaced node selector 424 determines whether a sequentially selected node satisfies the following conditions:
a) when the sequentially selected node is replaced with an equivalent table to form a new data structure, the maximum search time Tmax_t calculated form the new data structure is not longer than the maximum search time Tmax calculated at the step B3; and
b) when the sequentially selected node is replaced with an equivalent table to form a new data structure, the necessary amount of memory for the new data structure is smaller than before the replacement.

A decision on whether a sequentially selected node satisfies the condition (a) is made depending on, for example, the following equation:

$$N_D \leq N_L \times K, \text{ when } K = Te/Tu,$$

where $N_D$ is the number of items of data to be searched (which is the same as that of entries in the equivalent table) included in a set of data designated by the sequentially selected node, $N_L$ is the number of levels of the sequentially selected node or lower in the tree structure, Tn is the search time per node, and Te is the search time per entry in the equivalent table. If $N_D \leq N_L \times K$ for a selected node, then it is determined that the selected node satisfies the condition (a).

When having found a node satisfying both the conditions (a) and (b), the replaced node selector 424 outputs a pointer r indicating the found node to the equivalent table formation section 425 (step B4).

When the replaced node selection operation of the replaced node selector 424 has been completed as described above, the controller 421 starts the equivalent table formation section 425.

Upon receipt of the pointer r indicating the found node from the replaced node selector 424, the equivalent table formation section 425 releases a tree structure of the found node or lower. Thereafter, the equivalent table formation section 425 searches the memory 44 for a collection of data to be searched and corresponding related information, which are included in a set of data designated by the found node, and forms an equivalent table from the found collection of data and corresponding related information (step B5). Then, the equivalent table formation section 425 stores the equivalent table formed at the step B5 into the location indicated by the pointer r on the memory 44 (step B6).

The controller 421 may repeatedly start the replaced node selector 424 and the equivalent table formation section 425 arbitrary times. In the case where the replaced node selector 424 is started by the controller 421 two or more times, a previously selected node is canceled before performing the step B4.

Referring to FIG. 12, the tree structure of the node N6 or lower is replaced with an equivalent table N6_t. This data structure is constructed from the tree structure formed by the tree formation section 422 by operating the replaced node selector 424 and the equivalent table formation section 425 once.

An example of the data structure construction operation will be described, taking the came of Tn=Te=T, that is, K=Te/Tn=1 as an example, where Tn is the search time per node, and Te is the search time per entry in the equivalent table.

The tree formation section 422 forms a tree data structure as shown in FIG. 11 on the memory 44 and stores a pointer to the root node N1 in the root pointer register 423 (steps B1 and B2). Thereafter, the replaced node selector 424 calculates a maximum search time Tmax for the tree structure as shown in FIG. 11 (step B3). Since the lowermost level of the tree structure as shown in FIG. 11 is "4", the maximum search time Tmax for the tree structure is 4T.

Subsequently, the replaced node selector 424 sequentially selects the nodes starting with the root node N1 according to breadth-first search. If the node N1 is replaced with an equivalent table, then the number of entries in the equivalent table is 8. Therefore, the maximum search time Tmax_t required to search a new data structure including the equivalent table is 8T. Since Tmax_t=8T exceeds Tmax=4T, this node N1 does not satisfy the condition (a). This causes the replaced node selector 424 to select a subsequent node N2.

If the node N1 is replaced with an equivalent table, then the number of entries in the equivalent table is 4. Therefore, the maximum search time Tmax_t required to search a new data structure including the equivalent table is 5T. Which is obtained by adding the search time T for the node N1 to the search time 4T for the 4-entry equivalent table. Since Tmax t=5T exceeds Tmax=4T, this node N2 does not satisfy the condition (a). This causes the replaced node selector 424 to select a next node N6 because the breadth-first search scheme is employed.

If the node N6 is replaced with an equivalent table, then the number of entries in the equivalent table is 2. Therefore, the maximum search time Tmax_t required to search a new data structure including the equivalent table is 3T, which is obtained by adding the search time T for the node N1 to the search time 2T for the 2-entry equivalent table. Since Tmax_t=3T is smaller than Tmax=4T, this node N6 satisfies the condition (a).

Furthermore, in the case where each node needs 34 bits and each entry of an equivalent table needs 23 bits, the release of the nodes N6 and its child nodes N7–N9 reduces the number of bits by 136 (=34×4) and the number of bits required for the equivalent table N6_t is 46 (=23×2). Therefore, formation of the equivalent table N6_t achieves a reduction of 90 bits (=136–46), which means that the node N6 also satisfies the condition (b). The replaced node selector 424 selects the node N6 and outputs a pointer to the node N6 to the equivalent table formation section 425.

Upon receipt of the pointer to the node N6 from the replaced node selector 424, the equivalent table formation section 425 releases a tree structure of the node N6 and its child nodes N7–N9. As shown in FIG. 11, a set of data designated by the node N6 consists of all the bit strings starting with "10". The equivalent table formation section 425 searches the memory 44 for a collection of data to be searched and corresponding related information, which are included in the set or data designated by the node N6.

In this example, the memory 44 stores the data to be searched and corresponding related information as shown in FIG. 9. Therefore, the equivalent table formation section 425 finds two pairs of data, (1000, E) and (10000, F), as a collection of data to be searched and corresponding related information, which are included in the set of data designated by the node N6. The equivalent table formation section 425 forms data of entries for the equivalent table N6_t from the found pairs of data (1000, E) and (10000, F), respectively. Each of the entries stored in the equivalent table N6_t has a format composed of a 2-bit table node information flag field FG, a tail entry flag field, a data bit string field, a search bit length field, and a related information field. Each data bit string is obtained by adding "0" to a corresponding item of data so that the bit length thereof is equal to the maximum bit length of search data. The equivalent table N6_t formed as described above is stored at the location indicated by the pointer to the node N6 on the memory 44.

As described above, formation of an equivalent table according to the present embodiment can achieves a reduction of necessary amount of memory without increasing in maximum search time. In addition, the present embodiment can reduce the number of addresses to store the data structure. Assuming that the number of bits for each address is 32, the conventional data structure as shown in FIG. 4 needs 28 addresses because two addresses are needed to store data for each of 14 nodes.

Contrarily, according to the present embodiment, as shown in FIG. 12, the number of nodes is 9, the number of entries in the equivalent table N6_t is 2, the necessary number of addresses to store data for one node is 2, and the necessary number of addresses to store data for one entry is 1. Accordingly, the necessary number of addresses to store the data structure as shown in FIG. 12 is 20 (=2×9+1×2). Therefore, compared with the conventional data structure, the present embodiment allows the number of addresses in the memory to reduce by about 29%.

The invention claimed is:

1. A computerized method for controlling storage and retrieval of data in a memory device by constructing a data structure in which items of data are stored for search, comprising:
    a) forming an assumed tree structure in which all the items of data are stored;
    b) sequentially selecting a node from the assumed tree structure to select a sub-tree structure including the selected node and any child nodes of the selected node;
    c) forming an equivalent table storing at least a portion of the items of data included in the selected sub-tree structure in a table form;
    d) determining whether the selected sub-tree structure satisfies one or more predetermined conditions; and
    e) when the selected sub-tree structure satisfies the one or more predetermined conditions, replacing the selected sub-tree structure with the equivalent table to construct the data structure,
    wherein the predetermined conditions are that: 1) an amount of memory required to store a data structure including the equivalent table in place of the selected sub-tree structure is smaller than that required to store the assumed tree structure; and 2) search performance of the data structure is not lower than that of the assumed tree structure.

2. The method according to claim 1,
    wherein the condition (1) is further defined in that, when the selected sub-tree structure is replaced with the equivalent table to form a new data structure, a maximum search time Tmax_t calculated from the new data structure does not exceed a maximum search time Tmax calculated from the assumed tree structure; and
    the condition (2) is further defined in that, when the selected sub-tree structure is replaced with the equivalent table to form a new data structure, a necessary amount of memory for the new data structure is smaller than that for the assumed tree structure.

3. The method according to claim 2, wherein a decision on whether the condition (1) is satisfied is made depending on whether the following equation is satisfied:

$$N_D \leq N_L \times K, \text{ when } K=Te/Tn,$$

where $N_D$ is the number of items of data included in the selected sub-tree structure, $N_L$ is the number of levels of the selected node or lower in the assumed tree structure, Tn is search time per node, and Te is search time per entry in the equivalent table.

4. An apparatus for constructing a data structure in which items of data are stored for search, comprising:
    a tree formation section for forming an assumed tree structure in which all the items of data are stored;
    a node selector for sequentially selecting a node from the assumed tree structure to select a sub-tree structure including the selected node and any child nodes of the selected node, forming an equivalent table storing at least a portion of the items of data included in the selected sub-tree structure in a table form, and determining the selected sub-tree structure when it satisfies one or more predetermined conditions; and
    a data structure formation section for replacing the selected sub-tree structure satisfying the one or more predetermined conditions with the equivalent table corresponding to the selected sub-tree structure to construct the data structure,
    wherein the predetermined conditions are that: 1) an amount of memory required to store a data structure including the equivalent table in place of the selected sub-tree structure is smaller than that required to store the assumed tree structure; and 2) search performance of the data structure is not lower than that of the assumed tree structure.

5. The apparatus according to claim 4, wherein
    the condition (1) is further defined in that, when the selected sub-tree structure is replaced with the equivalent table to form a new data structure, a maximum search time Tmax_t calculated from the new data structure does not exceed a maximum search time Tmax calculated from the assumed tree structure; and
    the condition (2) is further defined in that, when the selected sub-tree structure is replaced with the equivalent table to form a new data structure, a necessary amount of memory for the new data structure is smaller than that for the assumed tree structure.

6. The apparatus according to claim 5, wherein a decision on whether the condition (1) is satisfied is made depending on whether the following equation is satisfied:

$$N_D \leq N_L \times K, \text{ when } K=Te/Tn,$$

where $N_D$ is the number of items of data included in the selected sub-tree structure, $N_L$ is the number of levels of the selected node or lower in the assumed tree structure, Tn is search time per node, and Te is search time per entry in the equivalent table.

7. A search system comprising:
    a tree formation section for forming an assumed tree structure in which all the items of data are stored;
    a node selector for sequentially selecting a node from the assumed tree structure to select a sub-tree structure including the selected node and any child nodes of the selected node, forming an equivalent table storing at least a portion of the items of data included in the selected sub-tree structure in a table form, and determining whether the selected sub-tree structure satisfies one or more predetermined conditions; and
    a data structure formation section for replacing the selected sub-tree structure satisfying the one or more predetermined conditions with the equivalent table corresponding to the selected sub-tree structure to construct the data structure that is stored in the memory,
    wherein the predetermined conditions are that: 1) an amount of memory required to store a data structure including the equivalent table in place of the selected sub-tree structure is smaller than that required to store the assumed tree structure; and 2) search performance of the data structure is not lower than that of the assumed tree structure.

8. The search system according to claim 7, wherein
    the condition (1) is further defined in that, when the selected sub-tree structure is replaced with the equivalent table to form a new data structure, a maximum search time Tmax_t calculated from the new data structure does not exceed a maximum search time Tmax calculated from the assumed tree structure; and
    the condition (2) is further defined in that, when the selected sub-tree structure is replaced with the equivalent table to form a new data structure, a necessary amount of memory for the new data structure is smaller than that for the assumed tree structure.

9. The search system according to claim 8, wherein a decision on whether the condition (1) is satisfied is made depending on whether the following equation is satisfied:

$$N_D \leq N_L \times K, \text{ when } K=Te/Tn,$$

where $N_D$ is the number of items of data included in the selected sub-tree structure, $N_L$ is the number of levels of the selected node or lower in the assumed tree structure, Tn is search time per node, and Te is search time per entry in the equivalent table.

10. A storage medium storing a computer-readable program for constructing a data structure in which items of data are stored for search, the program comprising the steps of:

a) forming an assumed tree structure in which all the items of data are stored;

b) sequentially selecting a node from the assumed tree structure to select a sub-tree structure including the selected node and any child node of the selected node;

c) forming an equivalent table storing at least a portion of the items of data included in the selected sub-tree structure in a table form;

d) determining whether the selected sub-tree structure satisfies one or more predetermined conditions; and e) when the selected sub-tree structure satisfies the one or more predetermined conditions, replacing the selected sub-tree structure with the equivalent table to construct the data structure, wherein the predetermined conditions are that: 1) an amount of memory required to store a data structure including the equivalent table in place of the selected sub-tree structure is smaller than that required to store the assumed tree structure; and 2) search performance of the data structure is not lower than that of the assumed tree structure.

11. The storage medium according to claim 10, wherein the condition (1) is further defined in that, when the selected sub-tree structure is replaced with the equivalent table to form a new data structure, a maximum search time Tmax_t calculated from the new data structure does not exceed a maximum search time Tmax calculated from the assumed tree structure; and the condition (2) is further defined in that, when the selected sub-tree structure is replaced with the equivalent table to form a new data structure, a necessary amount of memory for the new data structure is smaller than that for the assumed tree structure.

12. The storage medium according to claim 11, wherein a decision on whether the condition (1) is satisfied is made depending on whether the following equation is satisfied:

$$N_D \leq N_L \times K, \text{ when } K=Te/Tn,$$

where $N_D$ is the number of items of data included in the selected sub-tree structure, $N_L$ is the number of levels of the selected node or lower in the assumed tree structure, Tn is search time per node, and Te is search time per entry in the equivalent table.

13. A computerized method for controlling storage and retrieval of data in a memory device by constructing a data structure in which items of data are stored for search, comprising:

forming an assumed tree structure in which all the items of data are stored;

sequentially selecting a node from the assumed tree structure to select a sub-tree structure including the selected node and any child nodes of the selected node;

forming an equivalent table storing at least a portion of the items of data included in the selected sub-tree structure in a table form; and replacing the selected sub-tree structure with the equivalent table to construct the data structure, wherein the sub-tree structure is selected so as to satisfy the following conditions a) and b):

a) an amount of memory required to store the data structure is smaller than that required to store the assumed tree structure; and b) search performance of the data structure is not lower than that of the assumed tree structure.

\* \* \* \* \*